United States Patent
Crowther et al.

(10) Patent No.: US 9,405,934 B2
(45) Date of Patent: Aug. 2, 2016

(54) HIDING SENSITIVE DATA IN PLAIN TEXT ENVIRONMENT

(71) Applicant: GLOBALFOUNDRIES Inc., Grand Cayman (KY)

(72) Inventors: Fiona Margaret Crowther, Hursley (GB); Geleji Geza, Hursley (GB); Martin Andrew Ross, Hursley (GB)

(73) Assignee: GlobalFoundries Inc., Grand Cayman (KY)

( * ) Notice: Subject to any disclaimer, the term of this patent is extended or adjusted under 35 U.S.C. 154(b) by 17 days.

(21) Appl. No.: 14/328,906

(22) Filed: Jul. 11, 2014

(65) Prior Publication Data

US 2015/0026817 A1 Jan. 22, 2015

(30) Foreign Application Priority Data

Jul. 19, 2013 (GB) .................................... 1312917.6

(51) Int. Cl.
G06F 21/00 (2013.01)
G06F 21/64 (2013.01)
G06F 21/84 (2013.01)

(52) U.S. Cl.
CPC ............... *G06F 21/64* (2013.01); *G06F 21/84* (2013.01)

(58) Field of Classification Search
CPC ...................................................... G06F 21/64
USPC ............................................................ 726/26
See application file for complete search history.

(56) References Cited

U.S. PATENT DOCUMENTS

| 5,555,241 | A * | 9/1996 | Lazaridis et al. ............. 370/389 |
| 6,904,415 | B2 | 6/2005 | Krahn et al. |
| 7,240,209 | B2 * | 7/2007 | Carro ............................. 713/179 |
| 8,825,999 | B2 * | 9/2014 | Mohamed ...................... 713/153 |
| 2013/0028419 | A1 | 1/2013 | Das et al. |
| 2013/0275755 | A1 * | 10/2013 | Ignatchenko ................. 713/168 |

FOREIGN PATENT DOCUMENTS

| EP | 1410619 | 10/2006 |
| WO | WO0031917 | 6/2000 |

OTHER PUBLICATIONS

"Method and Apparatus to Dynamically Detect and Protect Sensitive Data on the Command Line," IPCOM000223680D, Nov. 23, 2012.
"CLI Command Completion Helper," IPCOM000216011D, Mar. 19, 2012.
"A Simple Technique to Manage Sensitive Data in a File," IPCOM000010301D, Nov. 19, 2002.
"System and Method for Securely Storing and Retrieving Data in Configuration Files," IPCOM000200318D, Oct. 5, 2010.

* cited by examiner

*Primary Examiner* — Longbit Chai
(74) *Attorney, Agent, or Firm* — Heslin Rothenberg Farley & Mesiti P.C.; George Blasiak

(57) ABSTRACT

Method and system for hiding sensitive data in a plain text environment. The method may include recognizing a starting key in a plain text environment, wherein the starting key indicates to a working system that the text input subsequent to the starting key is to be hidden according to a specified hiding method; receiving subsequent plain text, the working system carrying out the hiding method on the plain text, wherein the input plain text is not displayed in the plain text environment; and recognizing an ending key, ending the hiding method and displaying subsequently input plain text in the plain text environment. The starting key and ending key may also be used to indicate to the working system that the data subsequent to the starting key is hidden according to the specified hiding method. The starting key and ending key are the same or different escape characters.

23 Claims, 5 Drawing Sheets

HIDING SENSITIVE DATA IN PLAIN TEXT ENVIRONMENT

This Application claims the benefit of priority to United Kingdom Patent Application Serial No. GB1312917.6, filed on Jul. 19, 2013, the contents of which are hereby incorporated by reference.

FIELD OF INVENTION

This invention relates to the field of data security. In particular, the invention relates to hiding sensitive data in a plain text environment.

BACKGROUND OF INVENTION

It is becoming more and more important that sensitive data, such as passwords, are kept as hidden as possible. There are a large number of methods of obtaining this data, and it is vital that it is hidden.

There are many environments in which hiding sensitive data is not currently an option. Such environments may include, but are not restricted to, the following:

a. Command lines—Sometimes it is necessary to include a sensitive string within a command line instruction, in which case the item appears in plain text.

b. Parameter files—When a piece of sensitive data needs to be included in a parameter file, then it frequently cannot be encrypted and must appear as plain text.

c. Textual editor—In a text editor, text generally appears in plain format, with little indication as to whether it is sensitive or not.

d. z/OS® data set—Parameters within a z/OS data set may include a piece of sensitive data (z/OS is a trademark of International Business Machines Corporation, registered in many jurisdictions worldwide). Frequently, these are written as plain text, since the editor is unaware that the data is sensitive.

In such environments, it is frequently necessary for information such as passwords to be written in plain text as these environments have no way of knowing that the data they are about to read is sensitive or not.

Currently, many products require passwords to be specified in order to carry out certain commands in command line systems, such as stopping and starting systems. Parameter files are also in common use that contain a list of initialization parameters and a value for each parameter. In both cases, it is common that free text is used for simplicity. This leads to the problem of securing of data within a free text environment.

The security of passwords and other data is often compromised because the parameter files are frequently available to more than one user, and passwords can easily be read. Command lines can be seen by those watching what a user is typing.

There are also particular problems with z/OS data sets, where frequently these data sets are authorized to be read by other users so that configurations can be copied, but the passwords are again in plain text.

The idea of protecting text format of a password in plain text and OS itself is a known prior art, such as Linux or Unix OS and some GUI password field are all password protected. However this disclosure does address a known issue in z/OS and some text editors.

Some methods are known for encrypting sensitive data in plain text environments. One known method makes use of already known parameters that are included as part of a command. For example, anything following a '-p' is a password and should be encrypted. This requires all such entries to be determined by the user in advance.

Other methods include:

Possible encryption methods, which do not address the issue of identifying which text requires encrypting.

The use of textual attributes, which may not be available in all editors.

Manually hiding a specific field, which does not consider a command string.

The passing in of a symmetric key when a data access service is started, which does not consider command lines or the entry of sensitive information within a textual file.

Automatically removing sensitive data from a file, which is not an option when it is required in the future.

Therefore, there is a need in the art to address the aforementioned problems.

BRIEF SUMMARY OF THE INVENTION

According to a first aspect of the present invention there is provided a method for hiding sensitive data in a plain text environment, comprising recognizing a starting key in a plain text environment wherein the starting key indicates to a working system that the text input subsequent to the starting key is to be hidden according to specified hiding method; receiving subsequent plain text and the working system carrying out the hiding method on the plain text, wherein the input plain text is not displayed in the plain text environment; and recognizing an ending key and ending the hiding method and displaying subsequently input plain text in the plain text environment.

The method may include reading in a plain text environment by a working system, including recognizing a starting key in a plain text environment, wherein the starting key indicates to the working system that the data subsequent to the key is hidden according to a specified hiding method; unhiding the subsequent data by the working system carrying out an inverse hiding method on the data; and recognizing an ending key and ending the inverse hiding method and reading subsequent plain text.

The starting key and ending key may be the same or different escape characters. The escape characters may be selected as one or more of the group of one or more white space characters, one or more symbol characters that are distinctive in the plain text, and one or more characters that are distinctive in hidden data.

Reading in a plain text environment may enable a plain text command to be carried out.

The method may include after recognizing the starting key, recognizing an indication of a user group wherein a member of the user group is allowed to view the plain text subsequent to the starting key.

The hiding method may be one of the group of encryption, encoding, scrambling, or other hiding techniques. The unhiding method may be one of the group of decryption, decoding, unscrambling, or other techniques for obtaining plain text from hidden data.

The method may include determining if the user has a defined public/private key available to the working system; and using the public key in the hiding method to encrypt the plain text.

The method may include determining if the user's private key is available to the working system; and using the private key to decrypt the hidden text.

According to a second aspect of the present invention there is provided a system for hiding sensitive data in a plain text environment, wherein a working system is provided in communication with a plain text environment, wherein the working system includes a trigger start component for recognizing a starting key in a plain text environment, wherein the starting key indicates to the working system that the text input subsequent to the starting key is to be hidden according to a specified hiding method; a hiding component for receiving subsequent plain text and carrying out the hiding method on the plain text, wherein the input plain text is not displayed in the plain text environment; and a trigger end component for recognizing an ending key and indicating to the working system that the hiding method should end and subsequently input plain text be displayed in the plain text environment.

The trigger start component may be for recognizing a starting key in a plain text environment, wherein the starting key indicates to the working system that the data subsequent to the key is hidden according to a specified hiding method; and the system including an unhiding component for unhiding the subsequent data by the working system carrying out an inverse hiding method on the data; and wherein the trigger end component is for recognizing an ending key and ending the inverse hiding method and reading subsequent plain text.

The starting key and ending key may be the same or different escape characters. The escape characters may be selected as one or more of the group of one or more white space characters, one or more symbol characters that are distinctive in the plain text, and one or more characters that are distinctive in hidden data.

The unhiding component may enable a plain text command to be carried out by the working system.

The system may include a user group component for recognizing an indication of a user group wherein a member of the user group is allowed to view the plain text subsequent to the starting key.

The hiding method carried out by the hiding component may be one of the group of encryption, encoding, scrambling, or other hiding techniques. The unhiding method carried out by the unhiding component may be one of the group of decryption, decoding, unscrambling, or other techniques for obtaining plain text from hidden data.

The system may include a key pair component for determining if the user has a defined public/private key available to the working system; the hiding component using the public key in the hiding method to encrypt the plain text.

The system may include a key pair component for determining if the user's private key is available to the working system; the unhiding component using the private key to decrypt the hidden text.

According to a third aspect of the present invention there is provided a computer program product for hiding sensitive data in a plain text environment, the computer program product comprising a computer readable storage medium readable by a processing circuit and storing instructions for execution by the processing circuit for performing a method according to the first aspect of the present invention.

According to a fourth aspect of the present invention there is provided a computer program stored on a computer readable medium and loadable into the internal memory of a digital computer, comprising software code portions, when said program is run on a computer, for performing the method of the first aspect of the present invention.

According to a fifth aspect of the present invention there is provided a method substantially as described with reference to the figures.

According to a sixth aspect of the present invention there is provided a method substantially as described with reference to the figures.

The described aspects of the invention provide the advantage of providing a method of indicating that data is sensitive and encrypting it accordingly, while retaining data for use by the system in question when it is actually entered.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

Figure 1:
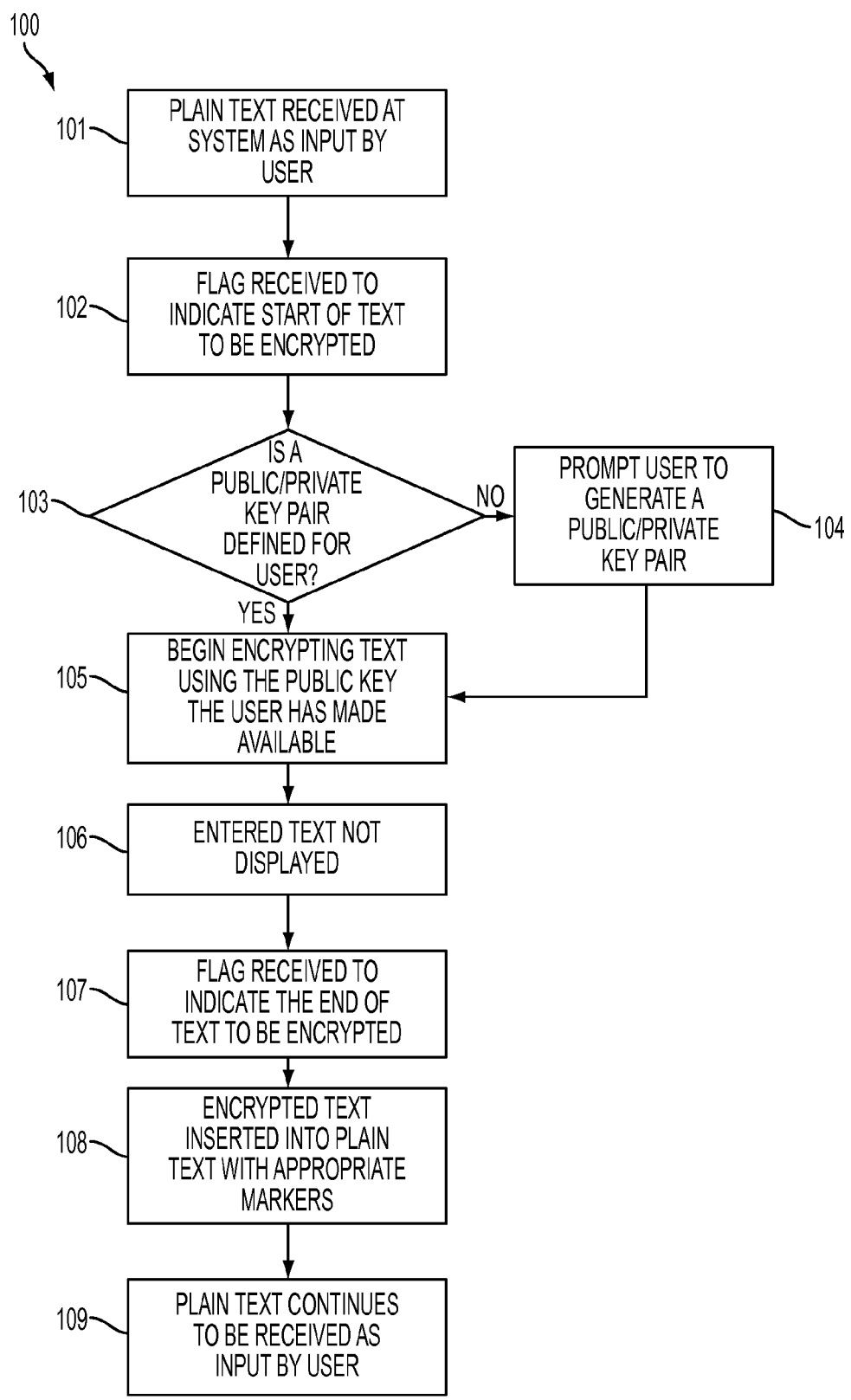
FIG. 1 is a flow diagram of an example embodiment of an aspect of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the described method and system, an escape character is specified to the working system that indicates that the data that is about to be entered must be put into a hidden form, which is known to the system (for example, encrypted, encoded, scrambled, etc.). Similarly, the escape character may indicate to the working system that the data that is about to be read is in a hidden form, which should already be known to the system. This allows the use of text passwords and other sensitive data in a plain text environment such as a command line, file environment, text editor, etc., without them appearing in plain text.

The preferred embodiment requires that a specific escape character be defined. When the escape character occurs, the system may be instructed to convert the subsequent plain text to a hidden form or, if the plain text is already hidden, read all the hidden data according to a specified form of hiding. These processes may continue until a second character (a termination escape character) indicates that the text to be hidden or the hidden data is ending and that plain text reading can continue.

A specific escape character may be defined in a system that will indicate that sensitive data is about to start. This escape character is not included in the final byte stream acquired from data, and so should be something that is not used in the data in any other way. This ensures that the escape character does not occur accidentally. If the escape character is required within the data then it is escaped.

The possibilities for escape characters may include:

1. A specific white space character or group of characters that is not likely to appear elsewhere in the data. For example, a "vertical tab" or a "form feed" character may not be used elsewhere in the data. If a single white space character cannot be found, then a group of characters might be more appropriate. For example, a "vertical tab" followed by a "form feed" is unlikely to occur as part of the data.

2. The occurrence of another specified character or group of characters that is included in the stream of the command. Such a character would be something that is not used as a regular part of the data such as a '/' or a '~'. If a single character that is not to be used cannot be found, then a group of characters might be more appropriate. For example, '/~#' is unlikely to occur as part of the data.

3. The occurrence of a specified termination escape character. This may or may not be the same as the escape character indicating the start of the sensitive data.

The text hiding method may be selected to ensure that the termination escape character does not occur within it. For example, with an encryption method, if it is decided that the termination escape character is "/" then the encryption should not encrypt to include the character "/". This will ensure the integrity of the entered data.

The described method is versatile enough to be utilized on many different operating systems, including the mainframe, where the use of plain text in configuration files is common place.

An additional aspect may be provided to specify in the plain text that an identified user or group of users may view the data following the escape character in its unencrypted rather than its encrypted form. For example, this may be required for the specified user(s) to edit the text.

In the example below, the start of a text encryption is indicated by a "/" and the end is indicated by a "\" by way of example. The following interpretations would be made.

PASSWORD=/XYZABC\USER=ASMITH

The word "PASSWORD" is plain text. The escape character "/" indicates that the encryption starts. The terminating character "\" indicates a return to plain text.

The security can be further increased when working within a textual file by allowing the specification of groups to edit or view of the text on taking certain actions such as moving through it. This means that certain groups of individuals would be able to view the contents of that file (for example, where it may be necessary for them to edit it) whereas other groups would not be able to see it. The escape characters being used to indicate that it should be secure text may be visible at the start of the text for the group who can view the text.

PASSWORD=/(G:123)XYZABC\USER=ASMITH

The word "PASSWORD" is plain text. This is followed by the escape character and group specification, "/(G:123)". Here, "/" is the escape character. The user/group specification, which will have previously been defined to the operating system, is indicated by "(G:123)". Here G is indicating that a group is being specified, and 123 indicates the number of the group. So group 123 is defined in the operating system as the group of users who are allowed to read what follows. The terminating character "\" indicates a return to plain text.

The flowcharts below demonstrate the use of the described method in three scenarios, the typing of text which is to contain encrypted data, the execution of a command containing such data, and the reading of a file containing encrypted data.

Referring to FIG. 1, a flow diagram 100 shows an aspect of the described method of inputting text containing sensitive data to be hidden by an encrypted method.

As a pre-processing step, a flag may be defined by a user in the form of an escape character (or plurality of characters) together with an encryption/decryption method. Additionally, a user/group of users who are able to view the encrypted form of the data may also be specified.

Text may be received 101 as a user may begin to type in plain text into a text environment, for example, in a command line or file environment. A flag may be received 102 as input by a user to indicate the start of text to be encrypted and recognized by a working system as a starting escape character.

Optionally, a user may insert an identification of user/group of users who are authorized to decrypt the data. The user/group identification may be provided within recognized characters (such as brackets ( . . . ) or dashes - . . . -) to indicate to the system that this data, although after the escape character flag, is not to be encrypted and indicates that a group is involved. If there are no group recognized characters after the escape character flag, then only the current user may be allowed to decrypt this field.

It may then be determined 103 if a public/private key pair is defined for the user or the identified group of users. If it is not, a prompt may be made 104 to the user to generate a public/private key pair.

The system may then begin 105 encrypting the subsequently inputted text using the public key that user has made available.

The encryption may be of any field or indeed part of a command that the users wishes. The encryption may be carried out on any value at the time specified by the user, so even when it is initially being entered on the screen it may appear in its encrypted format. The entered plain text may not be displayed 106.

When the user finishes entering the text that they wish to appear in the encrypted form, then they may enter a flag which is received 107 and recognized as an ending terminating character. This indicates to the system that the end of the encrypted text has been reached. The encrypted text may be inserted 108 into the plain text with appropriate markers at the beginning and end of the encrypted text.

Plain text may then continue to be received 109 as input by the user.

The input may contain further text requiring encryption, at which point the process is re-entered at step 101. Different fields may be encrypted with different users/group of users authorized to decrypt a particular field.

Figure 2:
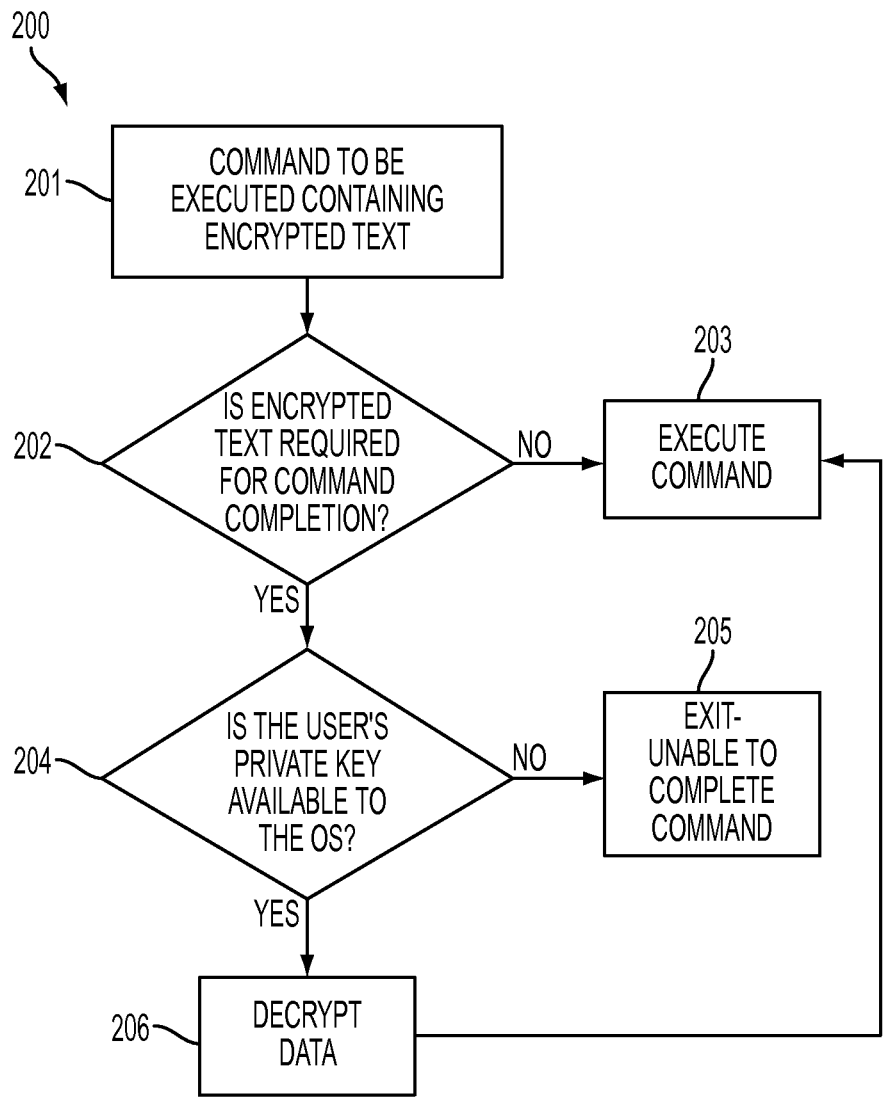
FIG. 2 is a flow diagram of an example embodiment of an aspect of a method in accordance with the present invention.

Referring to FIG. 2, a flow diagram 200 shows an aspect of the described method of executing a command containing encrypted data.

A command requires execution 201 and contains encrypted text. It may be determined 202 if the encrypted text is required for completion of the command. If it is not required, then the command may be executed 203 without decrypting the encrypted text.

If it is determined that the encrypted text is required for completion of the command, it is then determined 204 if the user's private key is available to the system. If the user's private key is not available, the process may exit 205 as it is unable to complete the command.

If the user's private key is available to the system, then the encrypted data may be decrypted 206 and used to execute 203 the command.

Figure 3:
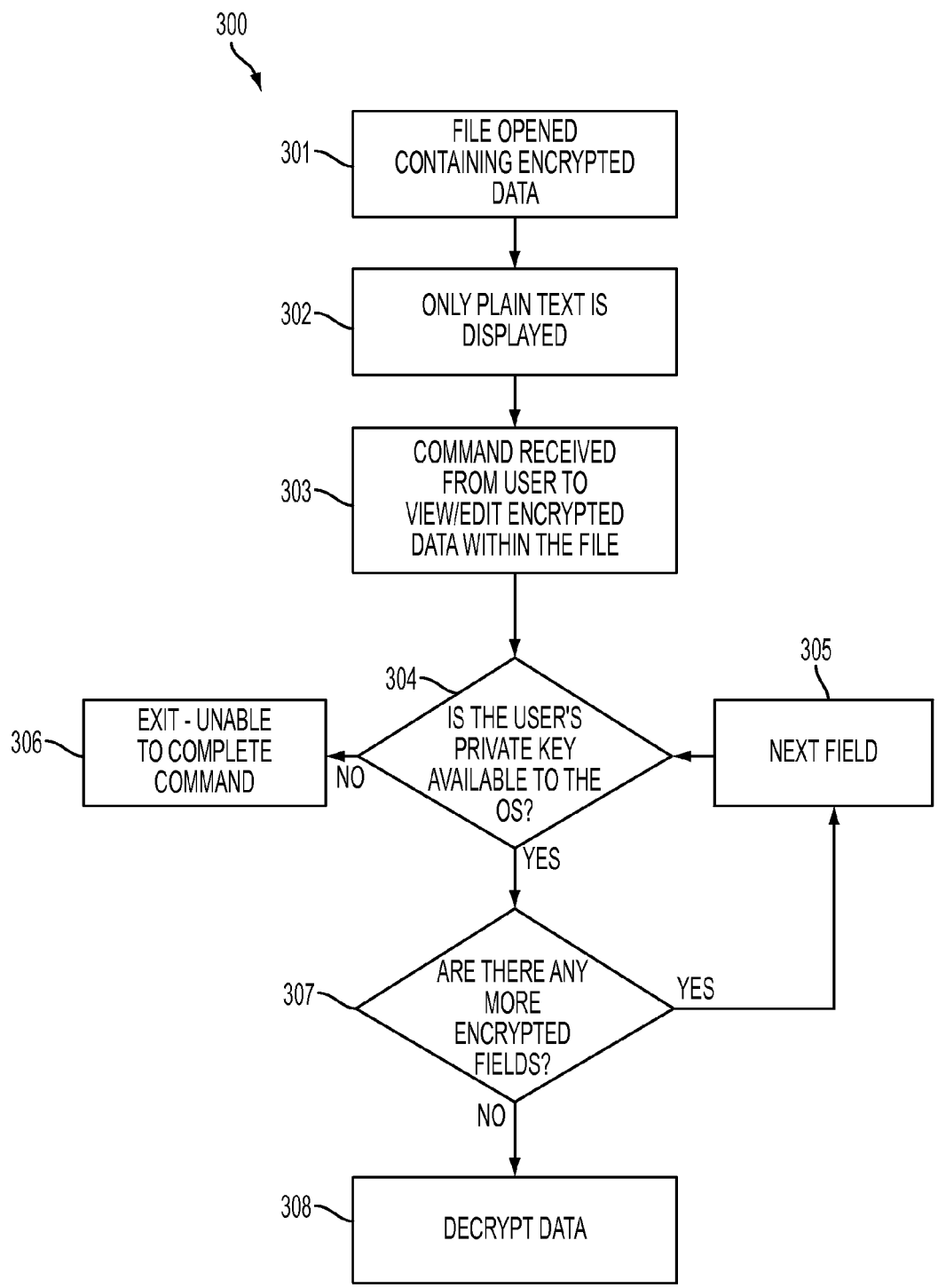
FIG. 3 is a flow diagram of an example embodiment of an aspect of a method in accordance with the present invention.

Referring to FIG. 3, a flow diagram 300 shows an aspect of the described method of reading of a file containing encrypted data.

A file may be opened 301 containing encrypted data with only the plain text in the file or data set member being displayed 302 as plain text, any encrypted text may either be hidden, or displayed as blanked out characters, for example as the '*' character.

At a later stage in the editing process, a subsequent command may be received 303 from a user to view or edit the encrypted data in the file or data set member.

The command may be dependent on the editor or system in use, but may consist of a menu item or a hotkey. For example, an additional menu item may be added to an edit menu for "Decrypt Sensitive Data." On mainframe systems, commands may be entered on a line at the top of the screen, and an additional command may be added, for example, "decrypt."

This will trigger any information that has been flagged as encrypted by the escape character to be decrypted and displayed if allowed for the user. As observed in step 302, only plain text has been displayed so far; encrypted text that has been flagged by the escape character has been bidden.

It may be determined 304 if the user's private key is available to the system. If it is detected that the user's private key is not available to the system then the command is exited 306 without being completed.

If the user's private key is available, then it is established 307 whether there are other encrypted data fields that can be decrypted (by this or other keys). If there are more fields, then the system moves onto the next field 305 and assesses this. If there are no more fields that require description, then the data may be decrypted 308 and displayed.

A user/group of users may be indicated after the escape character for a field identifying the users who are allowed to view/edit the encrypted text. For example, a user group (G:123) may be identified after the escape character and before the hidden text which would indicate that a user who is a member of the group "123" may only decrypt the data. This may also indicate that the key that can be used for decryption is that used by group "123." A user who is not a member of the group will not be able to decrypt this field; however, there may be other fields which the user is permitted to decrypt.

The command to decrypt may decrypt all the fields that a current user is allowed to see. If there are fields that have been encrypted by a different user, and the current user does not have the authority to see them, then the fields would not be decrypted.

The method may scan through the data and when it comes to an escape character, the authorization may be checked, either for the current user or as a group of users, and the field is decrypted, if allowed, until a termination escape character is reached.

The method may continue to scan through the data until another escape character is found. The authorization for this next encrypted field may be different to the previous field and again the current user's authorization is checked as an individual or as part of a group, if specified. If authorization is not given, the sensitive data will remain hidden from the user.

Figure 4:
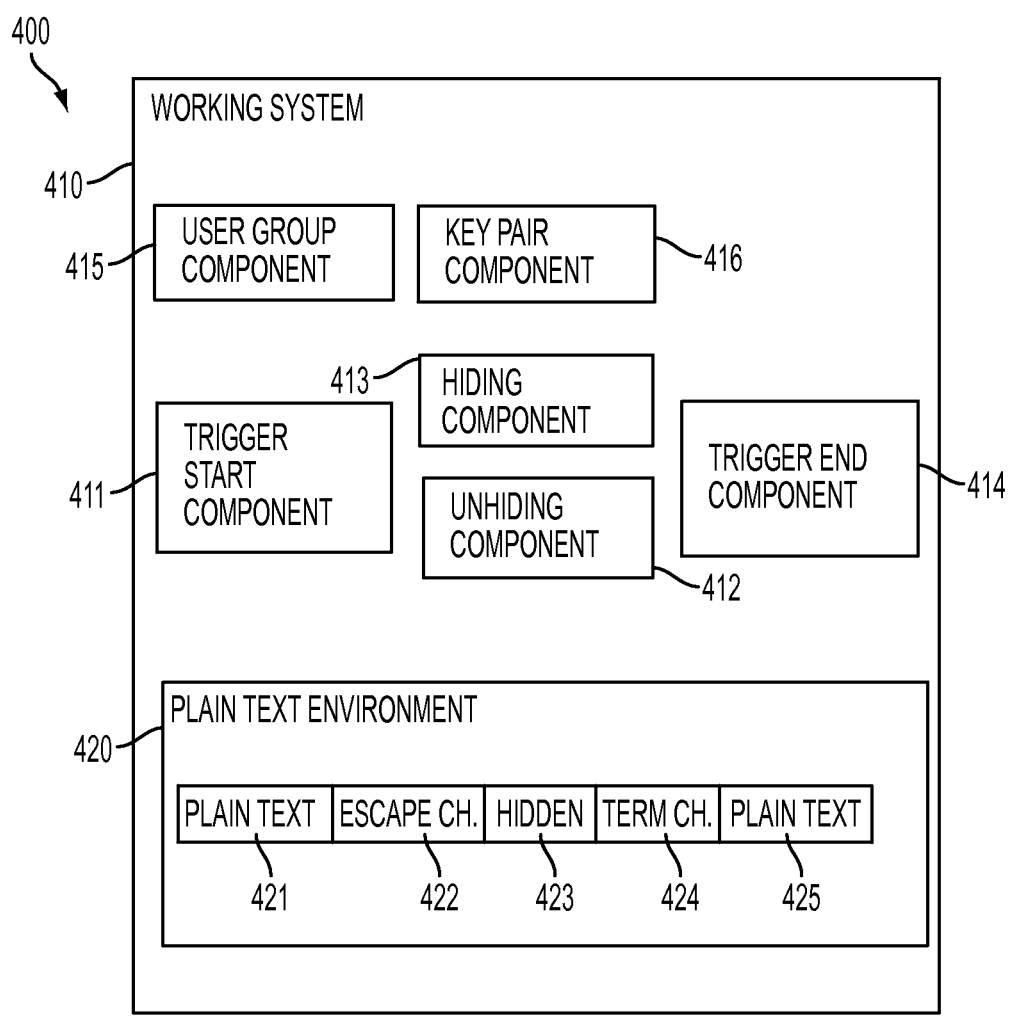
FIG. 4 is block diagram of an example embodiment of a system in accordance with the present invention.

Referring to FIG. 4, a block diagram shows a system 400 as an example embodiment of the described system.

A working system 410 may be provided in communication with a plain text environment 420. For example, the plain text environment 420 may be a command line environment, a file environment, a text editor, or any other environment in which inputs are made in plain text. The working system 410 may be, for example, an operating system, server, mainframe system, etc. hosting or in communication with the plain text environment 420.

The plain text environment 420 has means for inputting and displaying plain text. A user may input a sequence of plain text 421 including an escape character 422. The escape character 422 may be a sequence of characters that are not usually used in plain text. The escape character 422 may indicate to a trigger start component 411 of the working system 410 that the subsequent plain text being input must be hidden 423.

The trigger start component 411 may recognize the escape character 422 and start a hiding component 413 which may hide the plain text by means of encryption, encoding, scrambling, or any other algorithm that hides sensitive plain text.

The plain text being input may include a terminating escape character 424 which may be recognized by a trigger end component 414 as marking the end of the sensitive plain text to be hidden. The trigger end component 414 may instruct the hiding component 413 to end and the subsequent plain text input 425 in the plain text environment 410 may be displayed in the plain text environment.

The working system works similarly if text is being read in a plain text environment 420, for example, to carry out a command. The escape character 422 may be recognized by the trigger start component 411 and an unhiding component 412 may convert the hidden data back to plain text. The unhiding component 412 may use some form decryption, decoding, unscrambling, or other algorithm.

The hiding component 413 and unhiding component 412 may use a key pair component 416 which stores private/public key pairs for a user to be used at the hiding/unhiding method.

A user group component 415 may be provided which may enable authorization of a user to view/edit the hidden data.

Figure 5:
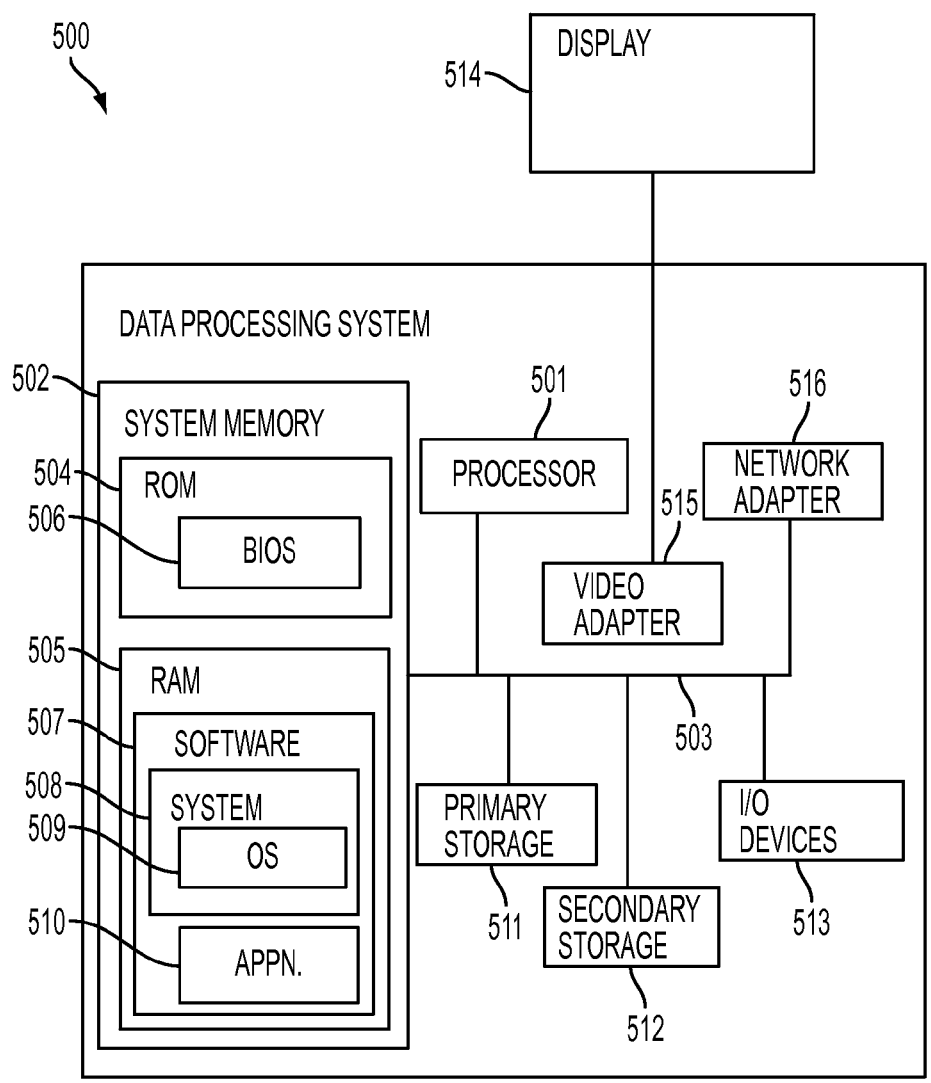
FIG. 5 is a block diagram of an embodiment of a computer system in which the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements may include local memory employed during actual execution of the program code, bulk storage, and cache memories that provide temporary storage of at least some program code in order to reduce the number of times code must be retrieved from bulk storage daring execution.

The memory elements may include system memory 502 in the form of read only memory (ROM) 504 and random access memory (RAM) 505. A basic input/output system (BIOS) 506 may be stored in ROM 504. System software 508 may be included in software 507 stored in RAM 505 including operating system software 509. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions data structures, program modules and other data for the system 500. Software applications may be stored the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 is an interface, such as video adapter 515.

EXAMPLES

Several examples are given below. In each case, the user has defined a public key between himself and the operating system that he is using for a given method of encryption/decryption. It may be a public key across the entire network (for example, a company UNIX network), or a key between the user and a single system (for example, a mainframe system).

The user may then define flags to the system that will indicate when encryption/decryption should begin and end. A typical flag may consist of more than one character, to reduce the chances of it actually occurring in the data. The user should select something that is unlikely to occur in his data. The flags may be the same for the start and the end of the data, or they may be different. This decision may be made by the user.

For the examples below, the flag '///' will be used to indicate the start of data encryption, and the flag '\\\' will indicate the end of data encryption.

Command Line Example

In this case, the command line has had a macro configured so that the functionality of this embodiment will occur. The user wishes to enter a command line which reads as follows:
    STARTMYPROG USERNAME=JSMITH PASSWORD=SAFETY The user does not wish the password to be visible when it is typed on the screen. However, this is in a free text environment and, at the time that the password is typed, the system is unaware that the password entered should not be displayed as text.

The user will now enter the following string:
    STARTMYPROG USER=JSMITH PASSWORD=///SAFETY\\\

However, what is actually displayed on the screen is different. The flag '///' at the start of the word 'SAFETY' indicates that the system should not display any entered data from this point on as it is encrypted. Therefore, what will actually appear on the screen will be different—for example:
    STARTMYPROG USER=JSMITH PASSWORD=z9?ba3

Therefore, the user is able to enter his command without the password being displayed.

Editor Example

Clearly editors in the market would need to be changed by the appropriate owners. The sale of this embodiment to such owners would add to its value. However, it may be necessary to provide a basic editor with the embodiment.

In such an editor, the key has been agreed upon between the user and the operating system being used, and the editor is aware of the flag used by the user. The user would be able to view the password clear text, but any other user viewing the file would only see the encrypted version of the data.

John Smith owns a file containing various parameters required by his software, which reads as follows:

```
LOCATION='/usr/somewhere'
USER=JSMITH
PASSWORD=///SAFETY\\\
```

However, when the file is read by one of his colleagues, the password is encrypted and will read:

```
LOCATION='/usr/somewhere'
USER=JSMITH
PASSWORD=z9?ba3
```

Despite the file being plain text, the password is encrypted. Therefore, the colleague is able to view the other parameters in the data without John Smith's password being compromised.

z/OS Data Set Example

John Smith owns a data set which again contains parameters, in fact the structure of the data set or a member of a PBS) contains the data as shown above;

```
LOCATION='/usr/somewhere'
USER=JSMITH
PASSWORD=///SAFETY\\\
```

Although the dataset is authorized to be read by a different user, the user data is encrypted so that the password is secured.

```
LOCATION='/usr/somewhere'
USER=JSMITH
PASSWORD=z9?ba3
```

In the z/OS case, there are additional issues with the length of records in the datasets having lengths defined to them. Therefore, the user would have to make certain that there was sufficient space in a record to include the 'start' and 'stop' flags as well as the password.

By using a pre-defined escape character, the described method allows the encryption of any field (or indeed part of a command) that the user wishes. The intention of the method is that it will encrypt any value at the time specified by the user, so even when it is initially being entered on the screen it will appear in its encrypted format.

The described method allows for configuration by the user so that the type of encryption and the escape character are defined by the user, rather than predefined by the application with the user having no control over these settings.

The described method is designed to be lightweight, and is not dependent on being backed by a large system.

The described method enables the protection of data in what is currently an unsecured environment. It also enables the use of escape characters for the purpose of indicating encryption. The benefits include improved security on entering information on its own systems as well as the enhanced security of shipped products, where it is currently necessary to enter plain text either on the command line or within files and data sets.

This gives the following advantages:
1. Data that can currently only be expressed in plain to on command lines or within files and data sets would be secured.

2. As new methods are developed, the restrictions on using sensitive data in this way would be relaxed because the data could now be encrypted.

3. The encryption method should be one already available to the user, removing the need for shipping actual encryption as part of the product.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program, product accessible from a computer-usable or computer-readable medium providing program code for use by or in connection with a computer or any instruction execution system. For the purposes of this description, a computer usable or computer readable medium can be any apparatus that can contain, store, communicate propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for hiding sensitive data in a plain text environment, comprising:
   recognizing a starting key entered by a user in the plain text environment, wherein the starting key indicates to a working system that text input subsequent to the starting key that is entered by the user is to be hidden according to a specified hiding method;
   receiving subsequent plain text, the working system carrying out the hiding method on the plain text so that input plain text is not displayed on a user display in the plain text environment at a time that the plain text is being entered by the user;
   recognizing an ending key, ending the hiding method and displaying on the user display subsequently input plain text being entered by the user in the plain text environment; and
   recognizing in the plain text a plain text character indication of a user group wherein a member of the user group is allowed to view the plain text subsequent to the starting key conditionally on a recognizing of the indication.

2. The method as claimed in claim 1, including reading, in a plain text environment by a working system, including:
   recognizing the starting key in a plain text environment, wherein the starting key indicates to the working system that data subsequent to the starting key is hidden according to a specified hiding method;
   unhiding the subsequent data by the working system carrying out an inverse hiding method on the data; and
   recognizing the ending key and ending the inverse hiding method and reading subsequent plain text.

3. The method as claimed in claim 2, wherein the unhiding includes one or more of the following selected from the group consisting of decryption, decoding, and unscrambling.

4. The method as claimed in, claim 3, including:
   determining if the user has a defined public/private key available to the working system;
   using the public key in the hiding method to encrypt the plain text.

5. The method as claimed in claim 4, including:
   determining if the user's private key is available to the working system;
   using the private key to decrypt the hidden text.

6. The method as claimed in claim 1, wherein the starting key and ending key are the same or different escape characters.

7. The method as claimed in claim 6, wherein the escape characters include one or more of the following from the group consisting of one or more white space characters, one or more symbol characters that are distinctive in the plain text, and one or more characters that are distinctive in hidden data.

8. The method as claimed in claim 7, wherein reading in a plain text environment enables a plain text command to be carried out.

9. The method as claimed in claim 8, including:
   after recognizing the starting key, recognizing an indication of a user group wherein a member of the user group is allowed to view the plain text subsequent to the starting key.

10. The method as claimed in claim 1, wherein the hiding method includes one or more of the following selected from the group consisting of encryption, encoding, and scrambling.

11. The method of claim 1, wherein the carrying out the hiding includes displaying on the user display encrypted data in response to plain text being entered by the user.

12. A system for hiding sensitive data in a plain text environment, wherein a working system is provided in communication with a plain text environment, wherein the working system comprises:
   a processor for executing a plurality of components including:
   a trigger start component for recognizing a starting key entered by a user in the plain text environment, wherein the starting key indicates to the working system that text input subsequent to the starting key that is entered by the user is to be hidden according to a specified hiding method;
   a hiding component for receiving subsequent plain text and carrying out the hiding method on the plain text so that input plain text is not displayed on a user display in the plain text environment at a time that the plain text is being entered by the user;
   a trigger end component for recognizing an ending key and indicating to the working system that the hiding method should end and subsequently input plain text that is entered by the user be displayed in the plain text environment; and
   a user group component for recognizing in the plain text a plain text character indication of a user group wherein a member of the user group is allowed to view the plain text subsequent to the starting key conditionally on a recognizing of the indication.

13. The system as claimed in claim 12 wherein the trigger start component is for recognizing the starting key in the plain text environment, wherein the starting key indicates to the working system that data subsequent to the starting key is hidden according to a specified hiding method; and the system including:

an unhiding component for unhiding the subsequent data by the working system carrying out an inverse hiding method on the data; and wherein the trigger end component is for recognizing the ending key and ending the inverse hiding method and reading subsequent plain text.

14. The system as claimed in claim 13, wherein the unhiding component enables a plain text command to be carried out by the working system.

15. The system as claimed in claim 13, wherein the unhiding carried out by the unhiding component includes one or more of the following selected from the group consisting of decryption, decoding, and unscrambling.

16. The system as claimed in claim 15, including:
a key pair component for determining if the user has a defined public/private key available to the working system;
the hiding component using a public key in the hiding method to encrypt the plain text.

17. The system as claimed in claim 16, including:
a key pair component for determining if the user's private key is available to the working system;
the unhiding component using the private key to decrypt the hidden text.

18. The system as claimed in claim 12, wherein the starting and ending key are the same or different escape characters.

19. The system as claimed in claim 18, wherein the escape characters include one or more of the following selected from the group consisting of one or more white space characters, one or more symbol characters that are distinctive in the plain text, and one or more characters that are distinctive in hidden data.

20. The system as claimed in claim 12, wherein the hiding method carried out by the hiding component includes one or more of the following selected from the group consisting of encoding, and scrambling.

21. A computer program product for hiding sensitive data in a plain text environment, the computer program product comprising a computer readable storage device storing instructions for execution by a processing circuit comprising:
instructions for recognizing a starting key entered by a user in a plain text environment, wherein the starting key indicates to a working system that text input subsequent to the starting key that is entered by the user is to be hidden according to a specified hiding method;
instructions for receiving plain text, the working system carrying out the hiding method on the plain text so that input plain text is not displayed on a user display in the plain text environment at a time that the plain text is being entered by the user;
instructions for recognizing an ending key and ending the hiding method and displaying on the user display subsequently input plain text being entered by the user in the plain text environment; and
instructions for recognizing in the plain text a plain text character indication of a user group wherein a member of the user group is allowed to view the plain text subsequent to the starting key conditionally on a recognizing of the indication.

22. The computer program product as claimed in claim 21, including instructions for reading in a plain text environment, including:
Instructions for recognizing the starting key in a plain text environment, wherein the starting key indicates to the working system that data subsequent to the starting key is hidden according to a specified hiding method;
unhiding the subsequent data by the working system carrying out an inverse hiding method on the data; and
recognizing the ending key and ending the inverse hiding method and reading subsequent plain text.

23. The computer program product as claimed in claim 21, wherein the starting key and ending key are the same or different escape characters.

* * * * *